April 2, 1946.　　　　R. H. GODDARD　　　　2,397,659
CONTROL MECHANISM FOR ROCKET APPARATUS
Filed July 29, 1942　　　5 Sheets-Sheet 2
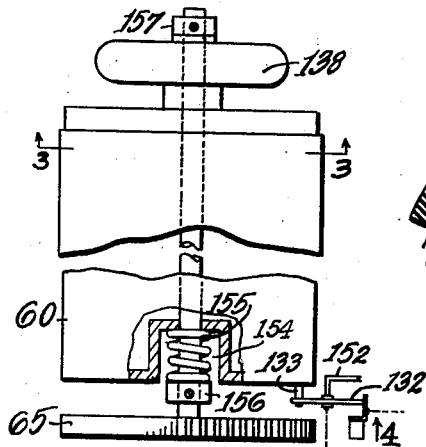
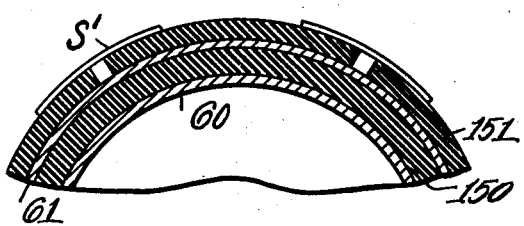
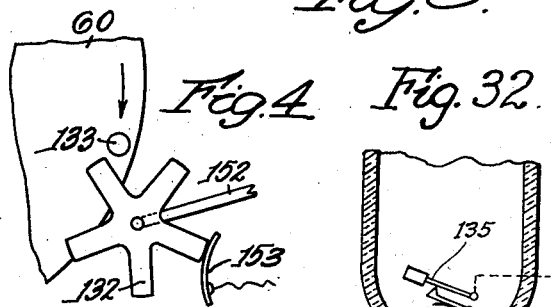
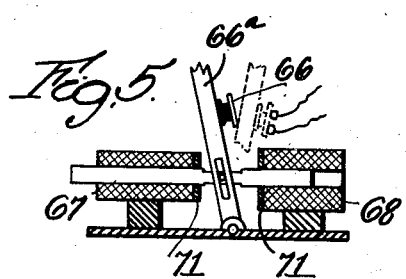
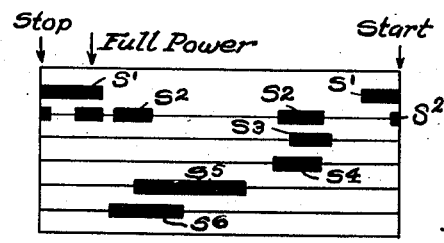
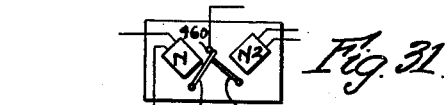
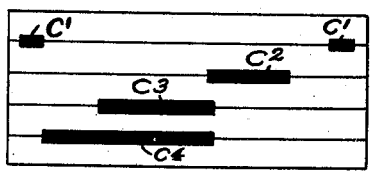
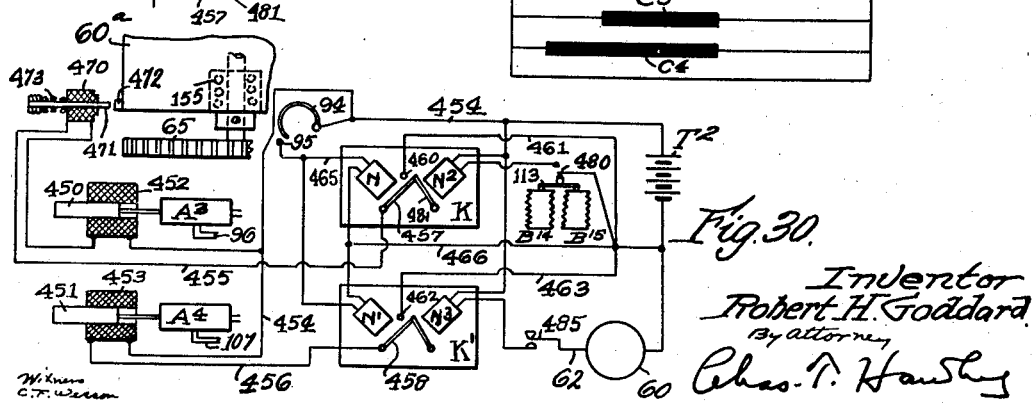
Inventor
Robert H. Goddard
By attorney April 2, 1946.  R. H. GODDARD  2,397,659
CONTROL MECHANISM FOR ROCKET APPARATUS
Filed July 29, 1942   5 Sheets-Sheet 3
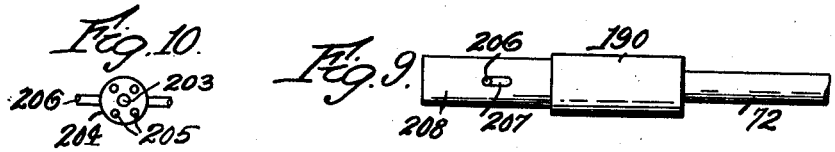
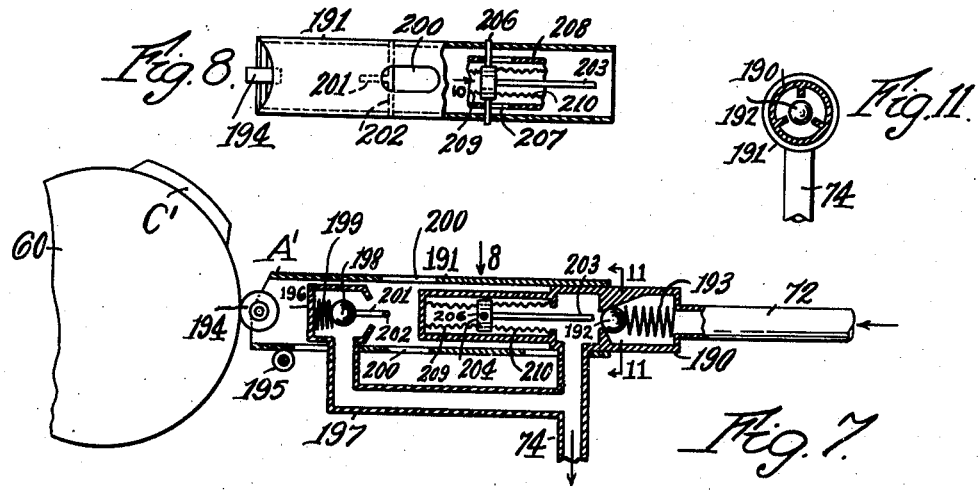
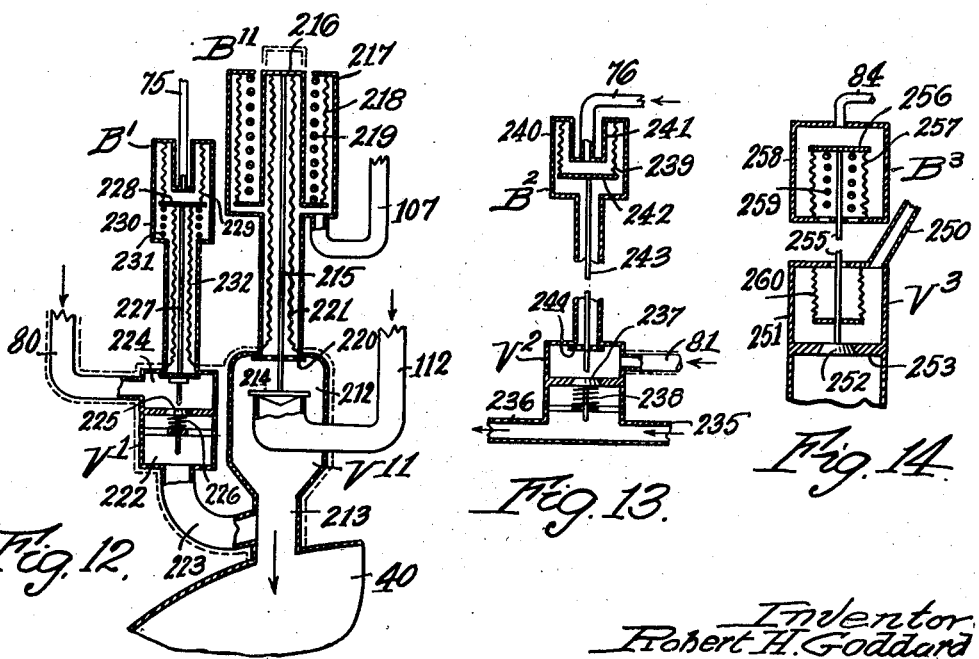
Inventor
Robert H. Goddard
By attorney
Chas. T. Hawley April 2, 1946. R. H. GODDARD 2,397,659
CONTROL MECHANISM FOR ROCKET APPARATUS
Filed July 29, 1942 5 Sheets-Sheet 4
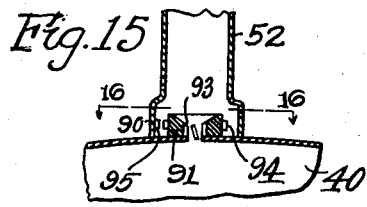
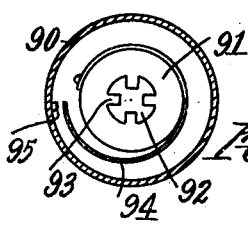
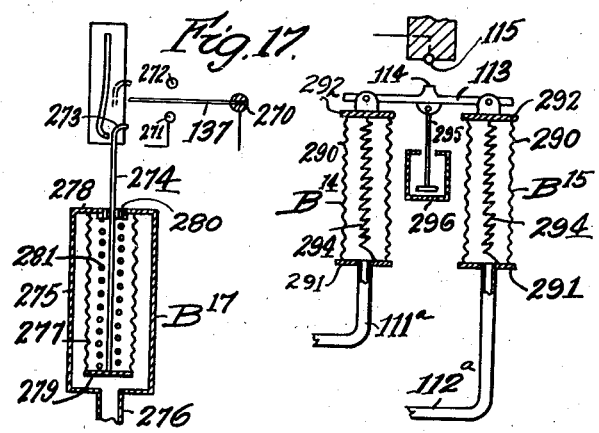
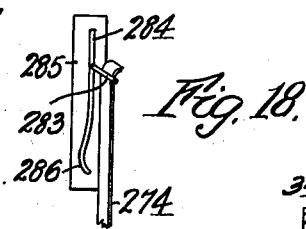
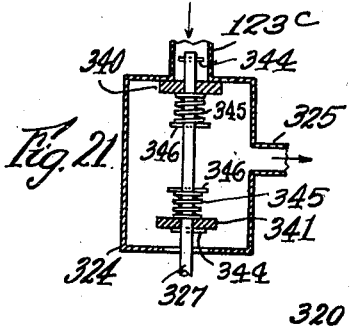
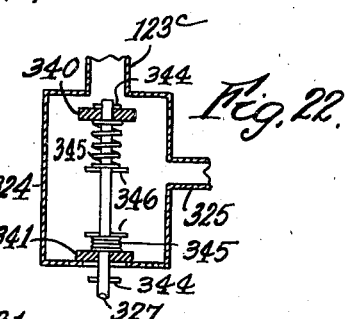
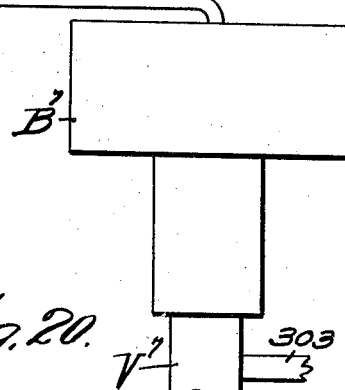
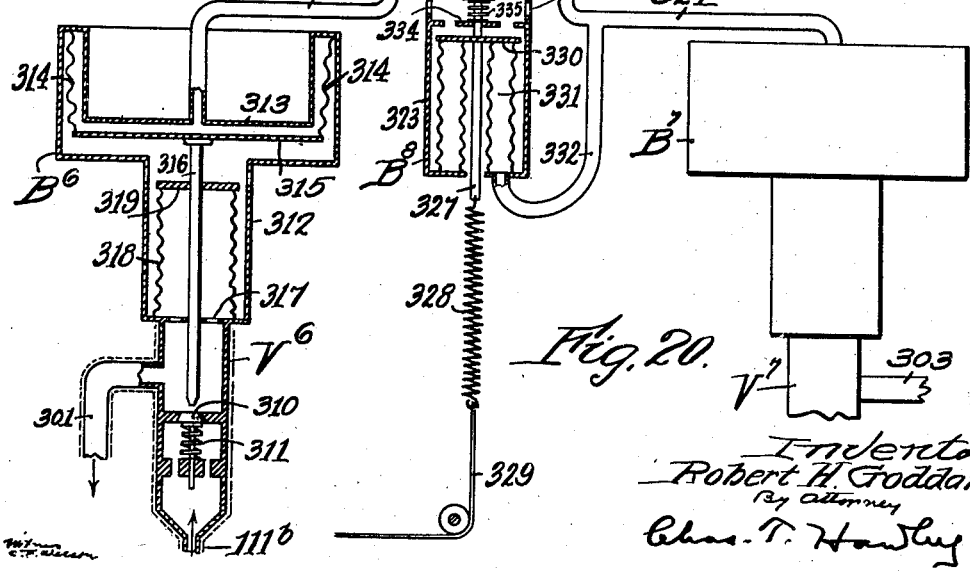
Inventor
Robert H. Goddard
By attorney
Chas. T. Hawley April 2, 1946.                R. H. GODDARD                2,397,659
              CONTROL MECHANISM FOR ROCKET APPARATUS
                    Filed July 29, 1942         5 Sheets-Sheet 5
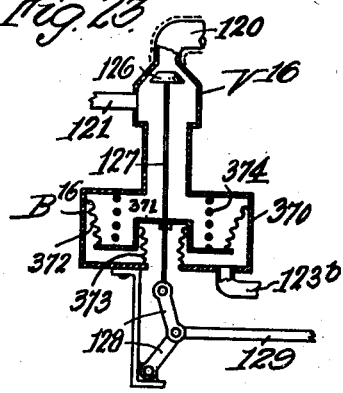
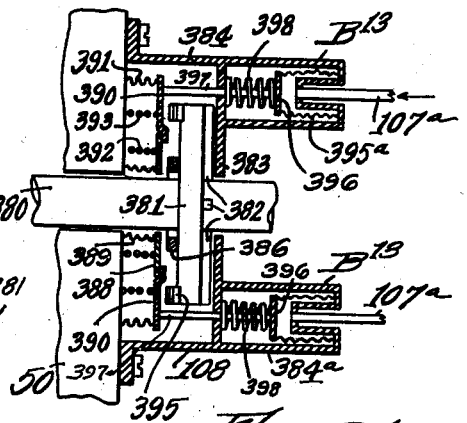
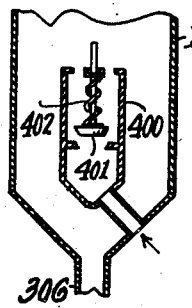
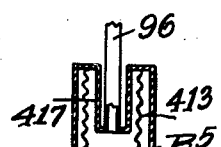
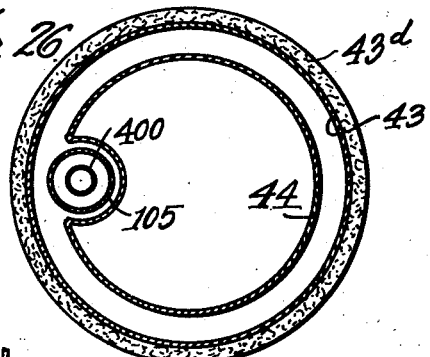
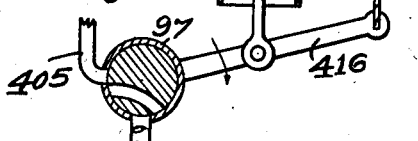
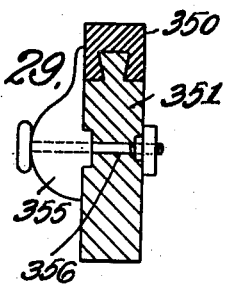
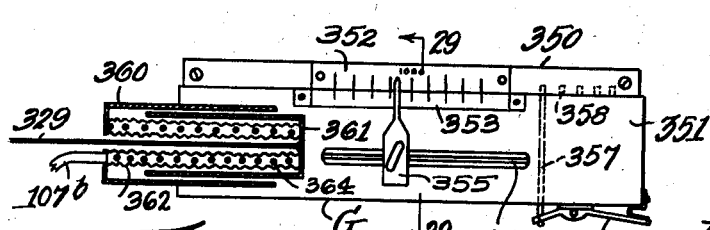
Inventor
Robert H. Goddard
By attorney Patented Apr. 2, 1946

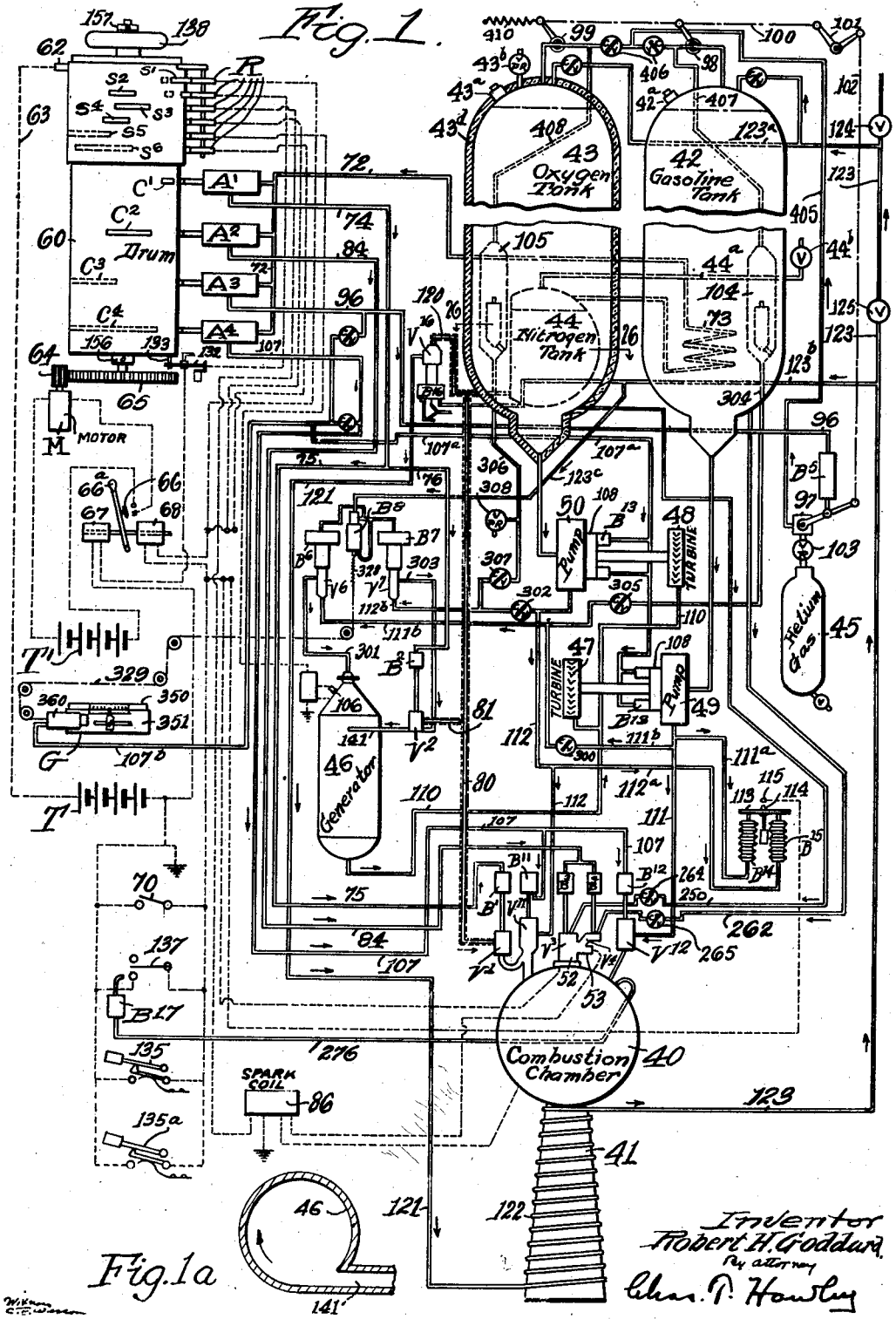

2,397,659

UNITED STATES PATENT OFFICE 2,397,659

CONTROL MECHANISM FOR ROCKET APPARATUS

Robert H. Goddard, Roswell, N. Mex., assignor of one-half to The Daniel and Florence Guggenheim Foundation, New York, N. Y., a corporation of New York Application July 29, 1942, Serial No. 452,754

20 Claims. (Cl. 60—35.6)

This invention is a continuation in part of my prior application Serial No. 399,333, filed June 23, 1941. The invention relates to rockets and rocket craft which are propelled by combustion apparatus using liquid fuel, such as gasoline, and a liquid to support combustion, such as liquid oxygen. Such combustion apparatus is disclosed in my prior application Serial No. 327,257, filed April 1, 1940, now patent No. 2,395,113.

It is the general object of my invention to provide control mechanism by which the necessary operative steps and adjustments for successful operation of such mechanism may be effected automatically and in predetermined and orderly sequence. More specifically, the object in this continuation case is to provide for automatic intermittent operation of rocket-type propulsion apparatus for long or short periods, with long or short intervals between, and with any desired degree of thrust.

To the attainment of this object, I provide control mechanism which will automatically initiate and sustain flight, which will automatically discontinue flight in a safe and orderly manner for intermittent operation, which is able to produce a varying thrust while in operation, and which also can be started again when it is desired to resume operations.

My invention further relates to arrangements and combinations of parts which will be hereinafter described and more particularly pointed out in the appended claims.

A preferred form of the invention is shown in the drawings, in which

Fig. 1 is a diagrammatic view of my improved control mechanism as applied to combustion apparatus of the general type shown in my prior application Serial No. 327,257;

Fig. 1ª is a detail sectional plan view of a generator to be described;

Figs. 2 to 29 inclusive show the detailed construction of many specific features of my invention, as follows:

Fig. 2 is a partial plan view of a control drum, partly in section;

Fig. 3 is a partial transverse section of the control drum, taken along the line 3—3 in Fig. 2;

Fig. 4 is an enlarged detail view, looking in the direction of the arrow 4 in Fig. 2;

Fig. 5 is a sectional side elevation of a solenoid-operated switch;

Fig. 6 is a development of the contact strips and cam segments on the surface of the control drum;

Fig. 7 is a sectional side elevation of one of the cam-operated control valves;

Fig. 8 is a plan view of certain parts thereof, partly in section and looking in the direction of the arrow 8 in Fig. 7;

Fig. 9 is a partial side elevation of an inner member of the valve shown in Fig. 7;

Fig. 10 is an enlarged detail view, looking in the direction of the arrow 10 in Fig. 8;

Fig. 11 is a detail sectional view, taken along the line 11—11 in Fig. 7;

Fig. 12 is a sectional side elevation of a combined main oxygen valve and nitrogen rinsing valve, together with bellows operators therefor;

Fig. 13 is a partial sectional side elevation of another nitrogen rinsing valve and a bellows operator therefor;

Fig. 14 is a sectional side elevation of an oxygen valve associated with the igniter and a bellows operator therefor;

Fig. 15 is a sectional elevation of the outlet portion of the igniter and shows a bi-metallic thermal element mounted therein;

Fig. 15ª is an enlarged sectional elevation of certain parts shown in Fig. 15;

Fig. 16 is an enlarged sectional plan view, taken along the line 16—16 in Fig. 15;

Fig. 17 is a side elevation of a circuit-breaking element, with a bellows operator therefor shown in section;

Fig. 18 is a detail perspective view of certain parts of the circuit-breaker shown in Fig. 17;

Fig. 19 is a side elevation, partly in section, of a double bellows circuit-closing device;

Fig. 20 is a side elevation, partly in section, of a pressure regulator for the oxygen and gasoline feed to the generator;

Fig. 21 is an enlarged sectional view of part of the regulating valve shown in Fig. 20;

Fig. 22 is a similar view but showing the valve in a different position;

Fig. 23 is a sectional side elevation of a valve which controls the nitrogen pressure;

Fig. 24 is a sectional side elevation of a pump sealing device in running position;

Fig. 24ª is a partial side elevation of a disc and flat spring appearing in Fig. 24 and to be described;

Fig. 25 is a partial sectional side elevation of an inner pressure tank admission valve;

Fig. 26 is a detail sectional view of certain associated tanks, taken along the line 26—26 in Fig. 1;

Fig. 27 is a side elevation, partly in section, of a valve which controls the helium gas feed;

Fig. 28 is a side elevation, partly in section, of a device which controls the spring tension for the regulator shown in Fig. 20;

Fig. 29 is a detail sectional view, taken along the line 29—29 in Fig. 28;

Fig. 30 (Sheet 2) is a diagrammatic view of a modified and electrically operated control for certain operative procedure;

Fig. 31 shows an interlocking switch in a position different from that shown in Fig. 30; and Fig. 32 is a sectional elevation of the lower part of a storage tank and showing a float valve mounted therein.

Briefly described, the rocket apparatus shown in Fig. 1 comprises a combustion chamber 40 having a nozzle 41 through which combustion gases are rearwardly discharged to propel the rocket or rocket craft in which the apparatus is mounted. Storage tanks 42, 43, 44 and 45 are provided for gasoline or other liquid fuel, for liquid oxygen or other liquid oxidizing agent, for liquid nitrogen, and for gaseous helium, respectively. The nitrogen tank 44 is immersed in the liquid oxygen in the lower part of the oxygen tank 43, and the tanks 42 and 43 have the usual filler plugs 42$^a$ and 43$^a$.

A gas generator 46 supplies gas under pressure to operate turbines 47 and 48, which in turn drive rotary pumps 49 and 50 by which gasoline and liquid oxygen are fed to the combustion chamber 40 and also to the gas generator 46.

For a full description of apparatus of the general type above described and of the detailed operation thereof, reference is made to my prior application Serial No. 327,257.

Gasoline and oxygen are also fed direct from the tanks 42 and 43 to an igniter 52 having a spark plug 53 by which the mixed gases are fired to provide an igniting flame as combustion is about to be started in the combustion chamber 40. Such an igniter is shown in detail in my prior Patent No. 2,090,039.

Before the apparatus is put in operation, the gasoline and oxygen tanks 42 and 43 are filled. The helium gas tank 45 is also filled at a pressure of several hundred pounds per square inch. Nitrogen gas is then introduced from an outside source through a pipe 44$^a$ into the nitrogen tank 44, where it liquefies, exerting about 45 lbs. pressure. When the tank 44 is filled with liquid nitrogen, the gas is cut off by a valve 44$^b$.

Nitrogen gas pressure is maintained in the gasoline and oxygen tanks at a moderate amount, such as 30 lbs., by gas-generating and regulating means to be described. If the pressure in the oxygen tank 43 exceeds 35 lbs., owing to evaporation, a safety valve 43$^b$ opens. The oxygen tank 43 is preferably provided with heat insulation, such as a felt covering 43$^d$, permanently enclosing the tank 43 and reducing the evaporation of liquid oxygen in the tank 43 and also of liquid nitrogen in the tank 44.

The present application relates to automatic control of various devices and connections through which oxygen and gasoline are fed to the generator 46 and to the combustion chamber 40, and relates also to the control of other devices to be described and which are involved in automatic intermittent operation of rocket-type propulsion apparatus.

Briefly stated, my improved control mechanism comprises a drum 60 (Fig. 1) having a series of contact strips S1, S2, S3, S4, S5 and S6 (Figs. 1 and 6) and a series of cam segments C1, C2, C3 and C4. The contact strips are insulated from each other but are all connected to a metal shell 61 (Fig. 3) connected by a brush 62 and wire 63 to a battery T or other suitable source of electric power. More than one contact strip, as S1 or S2, may be provided in spaced relation in a single annular path, as shown in Fig. 6.

The contact strips S1 to S6 engage associated contact brushes R in a plurality of electrical circuits, as clearly shown in Fig. 1, and the cam segments C1, C2, C3 and C4 engage and move sliding control members of associated three-way control valves A1, A2, A3 and A4 respectively. These valves control pressure circuits for bellows operators by which numerous valves and switches are shifted in predetermined sequence, as will be hereinafter described.

The drum 60 is rotated by a motor M through a pinion 64 and gear 65, and the motor M is driven from a battery T' or other suitable source of power, to which it is connected through a switch 66 on a switch lever 66$^a$, actuated by solenoids 67 and 68 (Fig. 5). The solenoid 68 is substantially stronger than the solenoid 67. Accordingly, when the smaller solenoid 67 is energized, the switch 66 is opened, as shown in full lines in Fig. 5, but only if the larger solenoid 68 is inactive. When the larger solenoid 68 is energized, the switch 66 is closed, as shown in dotted lines in Fig. 5, whether or not the solenoid 67 is also energized.

The electrical circuits controlled by the strips S1 to S6 function briefly as follows:

Strip S1 is in series with the battery T and also with the larger solenoid 68 which closes the switch 66 and starts the drum motor M. The S1 circuit also includes three sub-control switches in parallel, any one of which when closed may complete the S1 circuit when a strip S1 is contacted.

Strip S2 acts through the smaller solenoid 67 to stop the motor M, but only if the larger solenoid 68 is inactive.

Strip S3 controls the activity of the spark plug 53 in the igniter 52.

Strip S4 controls a motor-starting circuit through the solenoid 68, but only in conjunction with a thermostatic circuit-closer in the igniter 52.

Strip S5 controls the activity of a spark plug for the generator 46; and

Strip S6 controls a motor-starting circuit through the larger solenoid 68, but only in conjunction with a circuit-closing device responsive to the pressures in the main oxygen and gasoline feed lines.

The general cycle of operations controlled by the drum 60 through the contact strips S1 to S6 and cam segments C1 to C4 will now be described, after which the more specific construction of the numerous special devices included in the control mechanism will be described in detail and with special reference to Figs. 2 to 30 inclusive. The development of the drum 60 and associated contact strips and cam segments as shown in Fig. 6 will be found helpful in following the sequence of operations as described in the following pages.

In starting position, the contact strips S1 and S2 engage their associated brushes. When it is desired to start combustion in the combustion chamber 40, a switch 70 (Fig. 1) is moved to close a circuit from the battery T through the switch 70, solenoid 68, contact strip S1, brush 62 and wire 63 back to the battery T. The solenoid 68 is thus energized, shifting the switch lever 66$^a$ to close the switch 66 in the operating circuit between the motor M and the battery T'. The motor M thereupon starts the drum 60 in rotation.

Friction devices 71 (Fig. 5) are provided for the plunger operated by the solenoids 67 and 68. The plunger accordingly holds the switch 66 in either open or closed position until positively moved therefrom.

As soon as the drum 60 starts to turn, contact strip S2 moves out of engagement with its brush to deenergize solenoid 67, and cam segment C1 opens control valve A1, the construction of which is shown in detail in Figs. 7 to 11 and will be hereinafter described.

A pipe 72 is connected at one end to each of the control valves A1, A2, A3 and A4, and at the opposite end is connected through a coil 73 in the gasoline tank 42 to the nitrogen tank 44. The coil 73, being immersed in gasoline in the tank 42, warms the nitrogen sufficiently so that any entrained drops of liquid nitrogen will be vaporized in passing through the coil 73 and before they reach the control valves A1 to A4. If the liquid oxygen in the tank 43 is at atmospheric pressure, the vapor pressure of the nitrogen gas in the tank 44, coil 73 and pipe 72 will be approximately forty-five pounds.

When the liquid oxygen is at thirty to thirty-five pounds pressure, the vapor pressure in the nitrogen tank will be about one hundred and twenty pounds.

When control valve A1 is opened by cam segment C1, nitrogen gas under pressure will flow through the pipe 74 and branch pipes 75 and 76 to bellows operators B1 and B2 respectively, which in turn control nitrogen rinsing valves V1 and V2. Valve V1, when opened, admits liquid nitrogen from the tank 44 through a jacketed pipe 80 to the connections between the main oxygen valve V11 and the chamber 40. Valve V2 admits nitrogen from the branch jacketed pipe 81 to the oxygen connection to the generator 46.

Cam segment C1 (Fig. 6) is short and allows only a small amount of liquid nitrogen to enter the connections of said oxygen valves, and this small amount of liquid nitrogen is quickly vaporized.

This injected nitrogen serves the important purpose of diluting and ejecting from the combustion chamber 40 and generator 46 any explosive mixture of gasoline and oxygen or gasoline and air which might have been caused by leaky fuel valves.

The pipes 80 and 81 are jacketed to make certain that liquid rather than gaseous nitrogen enters the rinsing valves V1 and V2, as a corresponding amount of gaseous nitrogen would be insufficient to clear the connections. The detailed construction of these rinsing valves and their operating mechanism is shown in detail in Figs. 12 and 13 and will be later described.

Cam segment C1 (Fig. 6) then leaves control valve A1 and valve A1 closes, allowing the rinsing valves V1 and V2 to close. Contact strip S1 also moves from its brush and opens the circuit of the larger solenoid 68 but the switch 66 is held closed by friction.

As soon as control valve A1 is closed, cam segment C2 opens control valve A2. This admits gas under pressure through the pipe 84 to bellows operators B3 and B4 which control oxygen and gasoline valves V3 and V4 respectively in the igniter 52. The detailed construction of one of the bellows operators B3 and B4 and one of the valves V3 and V4 is shown in Fig. 14 to be described.

The specific construction of the igniter 52 forms no part of my present invention and the igniter may be similar to that shown in my prior patent No. 2,090,039. For the present, it is sufficient to state that when pressure is applied to the bellows operators B3 and B4, the oxygen and gasoline valves V3 and V4 are opened and oxygen and gasoline flow into the igniter 52, where they mix and are ignited by the spark plug 53. A thermostatic control device associated with the igniter 52 is shown in detail in Figs. 15 and 16 and will be later described.

At about the same time that control valve A2 is opened by cam segment C2, contact strip S3 completes a circuit through a primary spark coil 86, the secondary of which has a grounded connection with the spark plug 53, thus energizing the spark plug and starting the igniter 52 in operation.

A second contact strip S2 (Fig. 6) then closes the circuit through the small solenoid 67 and opens the motor control switch 66 (the solenoid 68 having been previously deenergized by breaking the contact on the strip S1).

The drum 60 then stops and remains at rest for a sufficient length of time to insure that an effective flame is produced by the igniter 52 and is projected into the combustion chamber 40.

As the feeding devices used in my apparatus produce an extremely intimate mixture of gasoline and oxygen as soon as the liquids enter the chamber 40, it is desirable that the mixture be ignited as promptly as possible to avoid risk of explosion. For this reason I provide a special construction to scatter or spread the flame widely in the interior of the chamber 40, which construction is shown in detail in Figs. 15 and 16 and will now be described.

The outlet of the igniter 52 (Fig. 15) is enlarged as shown at 90 to receive a member 91 having an axial opening 92 (Fig. 16) into which project a plurality of spiral or inclined vanes 93. A portion of the flame passes directly through the center of the opening 92, while other parts of the flame are deflected by the vanes 93 so that they are spread or scattered widely in the combustion chamber. The igniter 52 and member 91 are grounded.

A bi-metallic strip 94 is fixed at one end to the outside of the member 91 and is disposed in the annular recess between said member and the enlarged end portion 90 of the igniter 52. When the igniter is cold, the strip 94 contracts, so that the free end of the strip is out of engagement with an insulated contact stud 95 (Fig. 16).

Before the drum 60 was stopped by engagement of contact strip S2, contact strip S4 had established a partially completed circuit through the large solenoid 68, which circuit is completed when the bi-metallic strip 94 expands in the igniter 52 and engages the contact 95. The circuit is from the battery T through the brush 62 to the contact strip S4; thence through the solenoid 68 to the insulated stud 95 in the igniter 52. When the thermal element 94 engages the stud 95, the circuit is completed through the element 94 to the grounded igniter member 91 and thence to the grounded side of the battery T. The solenoid 68 then overcomes the smaller solenoid 67 and closes the switch 66, again starting the motor M and drum 60 after the igniter has become completely operative and the igniting flame is sufficiently intense. The contact strip S3 then moves out of engagement and breaks the spark plug circuit for the igniter 52, as the spark is no longer needed.

The circuit through contact strip S2 and small solenoid 67 is then quickly opened, after which contact strip S4 moves out of engagement with its brush, deenergizing solenoid 68 but leaving the drum 60 in rotation.

Cam segment C3 (Fig. 6) then opens control valve A3, which allows gas under pressure to flow through pipe 96 to a bellows operator B5 controlling the helium gas supply to the tanks 42 and 43.

Pressure in the pipe 96 actuates the bellows operator B5 (Figs. 1 and 27) to open a valve 97 and to close two shut-off valves 98 and 99, shown in Fig. 1 as connected by a cable 100, bell crank 101 and cable 102 to the operating arm of the valve 97. Opening of the valve 97 allows helium gas at a suitable high pressure maintained by a reducing valve 103 to pass to two small pressure tanks 104 and 105 located in the gasoline and oxygen tanks 42 and 43 respectively. The shut-off valves 98 and 99 close the vent connections of the small tanks 104 and 105 to the enclosing large tanks 42 and 43, and the pressure of the helium gas then causes the gasoline and oxygen to be forced through reducing valves V6 and V7 to the gas generator 46. The valves V6 and V7 (Fig. 20) have bellows operators B6 and B7 controlled by a regulating bellows B8, all of which special constructions will be later described.

At the same time that cam segment C3 operates, contact strip S5 (Fig. 6) makes contact and fires spark plug 106 in the gas generator 46. Combustion then takes place and the combustion gases, together with any excess oxygen gas, pass to the turbines 47 and 48, which then start the pumps 49 and 50.

Cam segment C4 on the drum 60 opens control valve A4 (Fig. 1) at the same time that control valve A3 is opened by cam segment C3. Control valve A4 is connected through a pipe 107 to bellows operators B11 and B12 which control the main oxygen valve V11 and the main gasoline valve V12. When the control valve A4 admits pressure to the pipe 107, the normally closed main oxygen and gasoline valves V11 and V12 are opened. The construction of one of these operators and valves is shown in Fig. 12 (to be described). Shortly after the main valves V11 and V12 are opened, the cam segment C2 allows control valve A2 to close and the gasoline and oxygen feed to the igniter 52 is discontinued. Thereupon the thermostatic device 94 cools and thereafter maintains the S4 circuit open.

Pressure in a branch pipe 107ª actuates bellows operators B13 (Fig. 24) to release sealing devices 108 and thus free the pump shafts for rotation. One of these sealing devices 108 will be hereinafter described in detail.

As the spark plug 106 has now been energized by contact of strip S5, the mixture of gasoline and oxygen will be ignited in the generator 46, developing heat and pressure and vaporizing excess oxygen gas under pressure, which gas is delivered to the turbines 47 and 48 through a pipe 110 and thereafter maintains the turbines 47 and 48 and pumps 49 and 50 in operation.

As soon as the parts last described are in effective operation, a third contact strip S2 makes contact and again energizes the small solenoid 67, opening the switch 66 and stopping the motor M and drum 60 until the pressures in the pumps 49 and 50 have risen to the full working amount.

The larger solenoid 68 was previously rendered inactive by breaking the circuit through S4.

The pumps 49 and 50 are connected through pipes 111 and 112 (Fig. 1) to the main gasoline and oxygen valves V12 and V11 respectively and by branch pipes 111ª and 112ª (Fig. 1) to bellows operators B14 and B15 (Fig. 19) respectively. These operators jointly control a switch lever 113 having a contact 114 adapted to engage a fixed contact 115. The lever 113 is grounded and such engagement completes the circuit through the large solenoid 68 and the contact strip S6 which is at this time engaged with its associated brush. This starts the motor M in further rotation.

The provision of the bellows operators B14 and B15 for the switch lever 113 insures that the helium gas pressure from the tank 45 will be supplied to force gasoline and oxygen from the small tanks 104 and 105 to the generator 46 until the pressures in both pumps 49 and 50 indicate that the gas generator 46 is in a condition of such activity as will permit discontinuance of the helium gas pressure.

Further rotation of the drum 60 now removes the cam segment C3 from engagement with the control valve A3. This releases pressure on operator B5 and permits valve 97 to close and valves 98 and 99 to open. This rotation also removes the contact strip S5 from its associated brush, which opens the circuit of the generator spark plug 106, no longer needed.

The contact strip S6 then passes out of brush engagement, opening the circuit of solenoid 68, and the contact strip S1 and an additional contact strip S2 are then engaged, the latter energizing the small solenoid 67, which opens the switch 66 and again stops the motor. The engagement of S1 is preliminary only.

The drum 60 will now remain stationary, even if the contact with the double bellows operated switch at 115 remains closed, as the strip S6 no longer engages its associated brush and the circuit for the larger solenoid 68 through 115 is thus open at S6.

As soon as the pumps 49 and 50 are started, it is necessary to supply nitrogen gas pressure to the tanks 42 and 43 to efficiently feed the gasoline and oxygen to the pumps. For this purpose I provide the regulating valve V16 and bellows operator B16 shown in Figs. 1 and 23.

The valve V16 receives liquid nitrogen from the tank 44 through a jacketed pipe 120 (Fig. 23) and delivers the nitrogen through a pipe 121 to a heating coil 122 (Fig. 1) wound on the discharge nozzle 41 of the combustion chamber 40. The coil 122 is connected by a pipe 123 and branch pipes 123ª to the tanks 42 and 43 respectively. The branch pipes 123ª have check valves opening toward the tanks. The nitrogen is evaporated by the heat of the nozzle.

In order to initially provide nitrogen gas pressure for the tanks 42 and 43, nitrogen gas from an external source may be introduced through a feed pipe having a shut-off valve 124 (Fig. 1). A second shut-off valve 125 is provided below the branch pipe 123ª.

The valve V16 (Fig. 23) includes a valve member 126 mounted on a valve rod 127 and connected to toggle links 128, which may be manually operated through a connection 129. When the propulsion apparatus is not in use, the valve V16 may be closed manually by straightening the toggle 129 and thus raising the valve member 126. As soon as the pumps 49 and 50 are started, however, the valve member 126 is to be manually released for automatic control by the nitrogen gas pressure in the pipe 123 which is communicated by a branch pipe 123ᵇ to the bellows operator B16.

A regulated pressure of approximately 30 lbs. is thus automatically maintained in the tanks 42 and 43. The detailed operation of this automatic pressure control will be later described.

The rocket motor is now under full power and will continue to operate as described in detail in my prior application Serial No. 327,257, until it is stopped manually or by exhaustion of fuel or by some accidental occurrence.

The apparatus may be rendered inoperative manually by momentarily closing the switch 70 a second time. This first energizes the large solenoid 68 through strip S1, previously contacted. Solenoid 68 then overcomes the small solenoid 67 and closes the switch 66, thus starting the drum 60 through a small forward movement, during which the circuit through contact strip S2 and solenoid 67 is broken by disengagement of S2 and its brush, and the cam segment C4 moves along and allows the control valve A4 to close.

Closing of the control valve A4 releases pressure in the pipe 107 and this allows the main oxygen valve V11 and the main gasoline valve V12 to close. Release of pressure in the pipe 107ᵃ also permits the bearings of the pumps 49 and 50 to be sealed against leakage while idle.

A slight further rotation of the drum causes a second cam segment C1 to open the control valve A1 momentarily, thus again admitting liquid nitrogen through the rinsing valves V1 and V2 to the combustion chamber 40 and to the generator 46 and thereby extinguishing combustion in the chamber and generator. Segment C1 then leaves valve A1 and the valves V1 and V2 close.

The manually controlled switch 70 is now released, if not previously released, rendering solenoid 68 inactive. The contact strip S1 and its associated brush remain in preliminary contact, however, so that the drum may be ready for a new cycle of operation.

The initial contact strip S2 then engages its brush, causing current to pass through the small solenoid 67 and open the switch 66, thus bringing the drum to rest.

A star wheel switch 132 (Figs. 2 and 4) is then automatically opened, preferably by a pin 133 on the end of the drum 60 which engages a part of the star wheel as the drum stops. The details of this switch are shown in Figs. 2 and 4 and will be later described. The control circuit through the solenoid 67 is thus broken but the switch 66 is left open. When the mechanism is again started by closing the hand switch 70, the pin 133 will advance the star wheel switch 132 to normal closed position.

If one of the fuel tanks becomes empty, a float switch 135 or 135ᵃ (Figs. 1 and 32) will close the circuit through the larger solenoid 68 (as above described for the hand switch 70) and will bring the apparatus to rest in the same manner as is effected by momentarily closing said hand switch. Such a float switch is shown and described in my copending application Serial No. 327,257 and the details thereof form no part of my present invention.

In case of accident to the apparatus, the pressure in the combustion chamber 40 will naturally fall off, allowing a pressure-controlled switch 137 (Fig. 1) to close and bring the drum 60 to rest, the same as occurs when the switch 70 is manually closed. The details of construction of the switch 137 and the bellows operator B17 therefor are shown in detail in Figs. 17 and 18, to be described.

If the drum 60 is stopped between its initial and final position, it may be restored to initial position by turning the drum 60 backward by use of the hand wheel 138 (Figs. 1 and 2). Special provision to be described is made to permit shifting the drum axially during such backward movement, so that the contact strips and cam segments will be out of alignment with their coacting elements during backward movement of the drum. The control circuits through the strips S1 to S6 are thus all open and the control valves A1 to A4 are all closed. The axial shift of the drum is accomplished by mechanism shown in Fig. 2 and to be described.

In normal intermittent operation, with long or short intervals between full stop and re-start, it is merely necessary to close the hand switch 70 to again start the drum 60.

The general construction and operation of the control apparatus above described is similar in many ways to that shown in my original application, Serial No. 399,333, but differs therefrom in certain important respects by which the apparatus is adapted for intermittent operation. These differences relate particularly to the provision of the helium gas pressure tank 45 and its operating connections to the tanks 42 and 43; to the provision of the small pressure tanks 104 and 105 in the tanks 42 and 43; to the provision of the nitrogen regulating valve V16 and its bellows operator B16; in the provision of the new pump sealing device shown in detail in Fig. 24, and to the provision of novel regulating valves V6 and V7 for the gas generator 46, which valves are automatically controlled by the manually adjustable spring tension device shown in Fig. 28.

Having described the general construction and method of automatic operation of my improved control mechanism, I will now describe the specific construction of the detail features shown in Figs. 2 to 29 inclusive.

The devices shown in detail in Figs. 2 to 19 are substantially as shown in my original application, Serial No. 399,333, but the devices shown in Figs. 20 to 30 are new and not found in the original application.

In Figs. 2 to 4, I have shown details of construction of the control drum 60 and certain associated parts. The drum 60 is rotated by the motor M through the pinion 64 and gear 65 previously described, and comprises an inner cylinder 60 on which the cam segments C1 to C4 are mounted, and a metal cylindrical shell 61 to which the contact strips S1 to S6 are connected. A sleeve 150 of insulating material separates the drum or cylinder 60 from the shell 61, and the contact strips as S1 are mounted outside of an insulating sleeve 151 but are each electrically connected to the shell 61. The metal sleeve 61 extends beyond the insulating material 151 at one end to provide contact surface for the brush 62 which is connected through the wire 63 to the battery T.

The switch 132 previously mentioned comprises a star wheel 132 (Fig. 4) pivoted on a fixed support 152 (Fig. 2) and engaged by the pin 133 once in each revolution of the drum 60. The star wheel is interposed in the circuit which controls the smaller solenoid 67 which opens the switch 66, and one finger of the star wheel normally engages a fixed spring contact 153 to close the circuit at the switch 132.

The star wheel 132 is engaged by the pin 133 just before the drum completes a revolution and is thus moved off of the contact 153, thus breaking the circuit of the solenoid 67 and leaving the switch 66 closed. As soon as the drum is started for another operation, the pin 133 advances the star wheel to again engage the contact 153 and leaves these parts in operative engagement until another revolution of the drum is completed.

It is desirable to prevent the cam segments and contact strips on the drum 60 from completing circuits or operating valves during a backward or resetting movement of the drum 60. For this purpose, the drum 60 (Fig. 2) and hand wheel 138 are frictionally driven from the drum shaft, so that the drum will ordinarily turn with the shaft but may be turned relative to the shaft by the hand wheel 138 for resetting.

The drum 60 is also recessed in one end, as shown at 154 in Fig. 2, to receive a compression spring 155. A collar 156 is fixed to the drum shaft to abut the spring 155, and a second collar 157 defines the normal axial position of the drum. The engaging surfaces of the hand wheel 138 and the collar 156 provide sufficient friction to cause the drum 60 to turn normally with the drum shaft.

When resetting the drum after a partial revolution, the operator first grasps the hand wheel 138 and shifts the drum axially against the spring 155 far enough so that the contact strips S1 to S6 and the cam segments C1 to C4 will be out of alignment with their associated brushes and valve actuator rolls. The drum can then be turned back to initial starting position. When released, the spring 155 will restore the drum to normal axial operating position. Resetting from any position between the initial and final positions of the drum 60 is readily accomplished in the manner above described.

Fig. 5 shows the details of the solenoid-operated motor-starting switch 66 and has been previously described.

Fig. 6 is a development of the surface of the drum 60, with the contact strips and cam segments arranged thereon as set forth in the preceding description of operation.

In Figs. 7 to 11 I have shown the construction of the control valve A1, which is identical with the control valves A2, A3 and A4.

The pressure supply pipe 72 is connected to a fixed inner casing 190 on which a cylindrical outer casing or sleeve 191 is slidable. A ball valve 192 is normally held in closed position by a spring 193 and prevents flow of gas under pressure to the control pipe 74. The outer sleeve 191 is provided at its rear end with a cam roll 194 adapted to be engaged by a cam segment C1 on the drum 60. A fixed guide-roll 195 offsets the side thrust of the cam segment C1 on such engagement and facilitates sliding movement of the sleeve 191.

The fixed cylinder 190 has a longitudinally separated inner chamber 196 supported by a branch vent pipe 197 which connects into the control pipe 74. The chamber 196 has a vent port adapted to be closed by a ball valve 198 actuated by a spring 199. When the valve 198 is open, the pipes 74 and 197 are vented to the atmosphere through slots 200 in the outer sleeve 191.

A stud 201 (Fig. 8) is mounted on a cross-pin 202 carried by the outer sleeve 191. When the roll 194 is not engaged by a cam segment C1, the pin 201 engages the ball vent valve 198 and vents the pipes 74 and 197, but when the roll is engaged by a cam segment, the pin 201 moves to the right in Fig. 7 and the vent valve 198 closes.

The second pin 203 (Fig. 8) is mounted in a disc 204 which is perforated as indicated at 205 (Fig. 10) and which is supported on a cross-pin 206, also secured in the outer sleeve 191 and movable axially in slots 207 in a reduced extension 208 of the fixed inner casing 190. Bellows packings 209 and 210 connect the disc 204 at each side to the fixed inner casing 190, and the pressures at the opposite sides of the disc are equalized through the perforations 205.

With this construction, a small movement of the outer sleeve 191 to the right by engagement with a relatively thin cam segment, as C1, will open the ball pressure valve 192 and admit pressure to the control pipe 74, and will simultaneously permit the ball vent valve 198 to close the branch or vent pipe 197. When the cam segment C1 thereafter leaves the roll 194, the outer sleeve 191 is moved to the left by the spring 193 (Fig. 7) which is larger and stronger than the spring 199. The pressure valve 192 then closes and the vent valve 198 is opened to vent the pipes 74 and 197.

In Fig. 12 I have shown the detailed structure of the main oxygen valve V11 and the bellows operator B11 therefor and also the nitrogen rinsing valve V1 and the bellows operator B1 therefor.

The main oxygen valve V11 comprises a chamber 212 having an open connection or outlet 213 to the combustion chamber 40. The oxygen supply pipe 112 extends inward and upward within the chamber 212 and the upper inner end of the pipe 112 is normally closed by a valve member 214, mounted on the lower end of a rod 215. The upper end of the rod 215 is connected to the closed upper end of an inner cylinder 216, mounted within the fixed outer casing 217 of the bellows operator B11 and connected thereto by a bellows member 218. A spring 219 normally forces the cylinder 216, rod 215 and valve member 214 downward to close the supply pipe 112. The lower part of the rod 215 is loosely slidable through a guide-plate 220. The reduced lower end of the bellows operator B11 is connected to the upper end of the inner cylinder 216 by a bellows packing sleeve 221.

The control pipe 107 from the control valve A4 connects through the outer casing 217 of the bellows operator B11. When pressure is applied through the pipe 107, the inner cylinder 216 is forced upward against the spring 219, thus opening the valve member 214 and admitting oxygen to the combustion chamber 40. When the control pipe 107 is vented, the spring 219 promptly closes the oxygen supply pipe 112. It will be noted that the direction of opening of the valve member 214 is such that pump pressure in the pipe 112 will tend to open, rather than to close, this valve.

The nitrogen rinsing valve V1 (Fig. 12) comprises a lower chamber 222 connected by a branch pipe 223 to the outlet 213 of the oxygen valve V11. The valve V1 also comprises an upper chamber 224 to which the nitrogen supply pipe 80 is connected. A valve member 225 between the chambers 222 and 224 is normally closed by a spring 226 which is strong enough to overcome the nitrogen pressure in the pipe 80.

A plunger 227 is connected at its upper end to a plate 228 which closes the lower end of a bellows member 229 in the bellows operator B1, which operator has a fixed outer casing 230 to which the upper end of the bellows member 229 is secured. A spring 231 is introduced between the plate 228 and a shoulder of the fixed casing 230 and normally lifts the plunger 227 away from the valve member 225.

The pressure or control pipe 75 from the control valve A1 is connected to the space inside of the bellows member 229 through an inwardly depressed portion of the upper end of the casing 230 of the bellows operator B1. When pressure is admitted through the pipe 75, the bellows operator B1 overcomes the spring 231 and opens the nitrogen valve V1 to admit nitrogen to the oxygen valve V11 and its connection to the combustion chamber 40, thus rinsing these parts with nitrogen and ejecting any explosive mixture of gases therefrom. A bellows seal 232 connects the plate 228 to the upper end of the casing of the valve V1 to prevent leakage of nitrogen around the plunger 227. Fig. 13 is a sectional elevation of the nitrogen rinsing valve V2 and bellows operator B2 associated with the oxygen connection to the generator 46. Under normal conditions, oxygen is present in the oxygen supply pipe 235 and in the generator connection 236 and also in the lower portion of the valve V2 below the valve member 237, which valve member is normally pressed upward to closed position by a spring 238. When the valve V2 and the generator connection 236 are to be rinsed, nitrogen gas from the supply pipe 81 is admitted by automatically depressing the valve member 237 by the bellows operator B2 provided for this purpose.

This bellows operator consists of a bellows member 239 mounted within a fixed casing 240 having a reentrant portion 241 to which one end of the pipe 76 is connected. The lower end of the bellows member 239 is closed by a plate 242 to which is secured a plunger 243, the lower end of which slides freely through a guide-plate 244 in the upper part of the valve V2. When pressure is admitted through the pipe 76 by operation of the control valve A1, the plate 242 and plunger 243 are depressed far enough so that the plunger engages the valve member 237 and opens the valve V2 to admit nitrogen to rinse said valve V2 and the connection 236 to the generator 46.

In Fig. 14 I have shown certain details of the bellows operator B3 which actuates the main valve V3 by which oxygen is admitted to the igniter 52 from a supply pipe 250 which extends to the oxygen tank 43.

The valve V3 comprises a casing 251 forming an upward extension of the igniter 52 and having a valve member 252 movable upward to close a port in the partition 253 which separates the valve V3 from the igniter 52. The valve member 252 is actuated by a rod 255 extending upward into the bellows operator B3 and connected to a plate 256 forming the upper end of a bellows member 257. This bellows member is mounted in a casing 258 which is connected to the control valve A2 by the pipe 84 previously described. A spring 259 holds the valve 252 normally closed, and a bellows sleeve 260 prevents leakage from the casing 251 around the valve rod 255.

When the control valve A2 admits pressure through the pipe 84, the rod 255 and valve member 252 are depressed, thus admitting oxygen to the igniter 52.

The construction of the bellows operator B4 and valve V4 which control the flow of gasoline from the pipe 262 (Fig. 1) to the igniter 52 is substantially the same as that of the operator B3 and valve V3 above described. Check valves 264 and 265 in the feed pipes 250 and 262 prevent reverse flow when the pressure in the combustion chamber 40 exceeds the pressure in the storage tanks 42 and 43.

Figs. 15 and 16 relate to the construction of the igniter 52 for the combustion chamber 40 and have previously been fully described.

Figs. 17 and 18 show the detailed construction of the control switch 137 and the bellows operator B17 by which the motor is stopped on substantial fall of pressure in the combustion chamber 40.

The switch 137 comprises a thin resilient contact strip mounted in a fixed stud 270 which is connected to the control circuit of the solenoid 68 in parallel with the manually controlled starting switch 70. The contact strip is normally positioned midway between a contact stud 271 through which the solenoid circuit is completed and a stop pin 272. The outer end of the strip 137 is positioned for engagement by the laterally projecting hooked upper end 273 of a flat rod 274, actuated by the bellows operator B17.

This bellows operator comprises a fixed outer casing 275 connected by a pipe 276 to the combustion chamber 40 (Fig. 1) and contains a bellows member 277 fixed to the upper end plate 278 of the casing 275. A plate 279 at the lower end of the bellows member 277 is connected to the lower end of the flat bar 274, which bar extends upward through a perforated guide-plate 280 in the upper end 278 of the casing 275. A compression spring 281 holds the parts in the position shown in full lines in Fig. 17 when there is no pressure in the combustion chamber 40.

As the pressure in the combustion chamber 40 and also in the bellows operator B17 rises to operative value, the bellows member 277 is compressed and the lateral projection or hook 273 of the flat rod 274 forces the contact strip 137 upward against the stop 272 and then slips upward past the end of the strip to the position shown in dotted lines in Fig. 17.

If the pressure in the combustion chamber 40 thereafter falls substantially, due to failure of fuel supply or to failure of any part of the apparatus to function as intended, the pressure in the bellows operator B17 will decrease and the spring 281 will force the bar 274 and hook 273 downward, moving the contact strip 137 into engagement with the stud 271 and thus completing a circuit through the solenoid 68 to start the motor M and initiate the successive operations necessary to bring the apparatus to rest, all as previously described.

It is not desirable that the circuit through the switch 137 remain closed as the apparatus stops and the pressure in the combustion chamber approaches atmospheric. Accordingly I provide the flat rod 274 with a guide-pin 283 movable in a slot 284 in a fixed guide-plate 285 (Fig. 18). The lower end of the slot 284 is curved outward, as indicated at 286, so that the hook 273 is moved to the left in Fig. 17 to clear the end of the strip 137 as the hook approaches its normal inoperative or lower position.

In Fig. 19 I have shown the details of construction of the double bellows contact maker which insures that helium gas starting pressure will be supplied to the small tanks 104 and 105 until the desired operating pressures are attained in the supply pipes 111 and 112 to which gasoline and oxygen respectively are delivered by the pumps 49 and 50.

This double bellows contact maker comprises duplicate bellows operators B14 and B15 (Fig. 19) respectively connected at their lower ends to branches 111ª and 112ª of the gasoline and oxygen supply pipes 111 and 112. Each operator B14 and B15 comprises a bellows member 290 having a fixed lower end plate 291 and also having a movable upper end plate 292 pivoted to one end of the contact lever 113 previously described. A tension spring 294 in each operator tends to contract the bellows operator in which it is mounted. A guide-rod 295 is loosely pivoted to the center of the lever 113 and is guided for limited vertical movement in a fixed casing 296.

When both operators B14 and B15 are expanded to correspond to predetermined pressures in the pipes 111 and 112, the movable contact 114 will engage the fixed contact 115 and complete a circuit through the large solenoid 68 and contact strip S6, thereby starting the motor M and thus permitting closing of the control valve A3, all as previously described.

In Figs. 20 to 22 I have shown the details of the regulating valves V6 and V7, the bellows operators B6 and B7 and the control operator B8. It will be understood that the construction and operation of the oxygen valve V7 and its operator B7 are identical with the valve V6 and operator B6, which latter are shown in section in Fig. 20 and will now be described in detail.

The gasoline-regulating valve V6 receives gasoline from the discharge pipe 111 (Fig. 1) of the gasoline pump 49 through a branch pipe 111ᵇ and check valve 300 and delivers gasoline through a pipe 301 to the upper end of the gas generator 46.

The oxygen-regulating valve V7 similarly receives liquid oxygen from the pump 50 through a branch pipe 112ᵇ and check valve 302 and delivers said oxygen through a pipe 303 to the rinsing valve V2, from which it is fed tangentially to the generator 46 through the pipe 141 previously described.

A pipe 304 connects the small pressure tank 104 in the gasoline tank 42 through a check valve 305 to the branch pipe 111ᵇ above the check valve 300, and a pipe 306 similarly connects the small tank 105 through a check valve 307 to the branch pipe 112ᵇ to the left of the check valve 302. A safety valve 308 is provided to relieve any excess pressure in the pipe 306.

The valve V6 (Fig. 20) comprises a valve member 310 normally pressed upward to closed position by a spring 311. The bellows operator B6 comprises a casing 312 having a recessed upper end portion 313 and containing a bellows member 314 provided with a movable lower end plate 315. A plunger 316 is secured to the end plate 315 and is guided near its lower end in an opening in a perforated partition 317. A bellows member 318 is secured at its lower end to the outer edge portion of the partition 317 and at its upper end to a disc 319 secured to the rod 316.

A pressure pipe 320 is connected to the depressed end portion 313 of the bellows member 314. Pressure exerted through the pipe 320 will thus depress the plate 315 and plunger 316 so that the plunger will engage the valve 310 and force the same downward, permitting gasoline to flow from the inlet pipe 111ᵇ through the outlet pipe 301 to the generator 46.

Exactly similar structure in the oxygen valve V7 and bellows operator B7 permits oxygen to flow from the inlet pipe 112ᵇ (Fig. 1) through the outlet pipe 303 (Fig. 20) to the generator 46 when pressure is applied through the pressure pipe 321.

It will be noted that the bellows members 314 and 318 act in opposition to each other, and that the position of the plunger 316 is determined by the differential action of these two bellows members. The pressure in the bellows 318 rises toward the delivery pressure of the pump 49 as soon as the valve 310 is opened by the plunger 316.

The bellows member 314 is much larger than the member 318 and operates at relatively low nitrogen gas pressure, derived from the heating coil 122 and the nitrogen distributing pipe 123 through the successive branch pipes 123ᵇ and 123ᶜ (Fig. 1). The pressure in the pipe 123ᶜ is commonly maintained at 30 lbs. by the regulator valve V16, and the pressure in the pipes 320 and 321 (Fig. 20) is normally substantially less than the pressure in the pipe 123ᶜ, by reason of the pressure control of the bellows operator B8.

This bellows operator comprises a casing 323 (Fig. 20) having a reduced upper end portion 324 to which the nitrogen pressure pipe 123ᶜ is connected. A pipe 325 connects the casing portion 324 to the branch pipes 320 and 321 previously described.

A plunger 327 is vertically slidable in the casings 323 and 324 and is connected at its lower end to a tension spring 328, which in turn is connected through a cord 329 to a tension regulating device G (Fig. 1), the details of which are shown in Figs. 28 and 29, to be described.

A plate 330 (Fig. 20) is mounted on the plunger 327 and forms the upper end of a double bellows member 331, the interior of which is connected through a branch pipe 332 to the pipe 321. The plunger 327 is slidable in a perforated partition 334 and, when released of tension, is pressed upward by a spring 335 acting against a collar on the plunger.

In its upper portion, the plunger 327 has two valve members 340 and 341 slidably mounted thereon and adapted to close openings in the upper and lower ends of the upper casing portion 324. The opening in the lower end communicates with atmosphere through openings 342 (Fig. 20) in the upper part of the casing portion 323. The opening in the upper end communicates direct with the pressure pipe 123ᶜ.

Cross pins 344 determine the normal positions of the valve members 340 and 341 on the plunger 327, and springs 345 are interposed between the valve members and additional cross pins 346 in the plunger 327. The springs 345 normally seat the valve members 340 and 341 against the cross pins 344.

If the spring 328 is not tensioned, the plunger 327 will be moved upward by the spring 335 and the valve members will occupy the positions shown in Fig. 21, with the gas pressure pipe 123ᶜ closed off by the valve member 340. The springs 335 and 345 are of sufficient strength to overcome the normal thirty pounds nitrogen gas pressure in the pipe 123ᶜ.

At the same time, the valve member 341 is raised from the lower end of the casing 324, thus venting the bellows members 314 in the bellows operators B6 and B7 and also venting the double bellows member 331. The springs 311 (Fig. 20) thereupon close the valve members 310 to shut off feed of gasoline and liquid oxygen to the generator 46.

When the spring 328 is tensioned, the plunger 327 is drawn downward, overcoming the spring 335 and moving the plunger to some such position as is shown in Fig. 22, with the valve member 341 closing the lower end of the casing 324 and with the valve member 340 moved downward to open the pressure pipe 123ᶜ.

Nitrogen gas pressure is then transmitted through the connection 325 and the branch pipes 320 and 321 to the bellows operators B6 and B7 and also through the branch pipe 332 to the double bellows member 31. The member 331 thereupon acts in opposition to the tension of the spring 328 to bring the plunger 327 to rest for some pressure intermediate between zero and 30 lbs.

This balance of forces thereafter maintains a regulated pressure for the bellows operators B6 and B7 so long as the tension of the spring 328 and the pressure in the pipe 123ᶜ remain constant.

The propulsive force or thrust of the rocket apparatus varies with the rate of feed of gasoline and oxygen to the combustion chamber 40 by the pumps 49 and 50. The speed of these pumps is determined by the turbines 47 and 48, and the speed of the turbines is determined by the rate at which combustion gases and oxygen gas are produced in the generator 46. This rate of gas production depends on the rate of feed of gasoline and oxygen from the regulating valves V6 and V7 through the pipes 301 and 303 to the generator 46.

Consequently the propulsive thrust of the apparatus depends on the amount of opening of the valve members 310 in the valves V6 and V7 (Fig. 20). Such valve opening depends on the operation of the bellows members 314 in the operators B6 and B7 under control of the bellows operator B8, which in turn depends on the tension of the spring 328. Consequently, by varying the tension of the spring 328, the propulsive force or thrust of the rocket apparatus may be variably controlled.

The tension regulating device G (Figs. 28 and 29) provided for varying the tension on the spring 328 comprises a fixed support 350 in which a slide 351 is movably mounted and supported.

The support 350 is provided with a graduated scale 352 and the slide 351 is provided with a similar graduated scale 353. An index block 355 has a bolt and slot connection to the slide 351 and may be adjusted lengthwise of the slot 356 to any desired position which will be indicated on the scale 353. The slide 351 is locked to the support 350 by a locking plunger 357 which extends into a selected opening 358 in the support 350. The plunger 357 may be manually withdrawn by shifting a spring-pressed lever 359 when adjustment of the slide 351 relative to the support 350 is desired.

A bellows casing 360 is fixed on the slide 351 and a movable casing 361 telescopes therein. A double bellows member 362 is connected to the inner end surfaces of the casings 360 and 361 and is adapted to receive pressure through the pipe 107ᵇ (Fig. 1) which connects through check valves to the pipes 107 and 96 controlled by the valves A3 and A4. Pressure is thus available in the pipe 107ᵇ whenever either valve A3 or A4 is opened.

A tension spring 364 in the double bellows member 362 normally draws the telescoping casing 361 inward to relieve the tension on the spring 328 when no pressure is supplied to the pipe 107ᵇ from either control valve A3 or A4. When pressure is so admitted to the bellows member 362, the casing 361 will be moved to the right in Fig. 28 until it engages the index block 355 which thus determines the initial extension of the spring 328. By adjusting the block 355 along the scale 353, this initial extension and corresponding tensioning of the spring 328 may be selectively determined.

If during the operation of the apparatus a change in propulsive force is desired without changing the setting for the initial spring tension, such a change may be accomplished by manually withdrawing the locking plunger 357 and shifting the slide 351 relative to the support 350, the amount of such movement being indicated by the displacement of the scales 352 and 353 relative to each other. I am accordingly able to control the propulsive thrust very simply by initially setting the block 355 and by relatively shifting the slide 351.

As the nitrogen gas pressure is relatively low, and as the control pressure in the branch pipes 320, 321 and 323 is even lower, the position of the valves in the regulator B8 (Fig. 20) may be varied and controlled by a relatively light spring 328 and the slide 351 may be quite easily adjusted manually to vary the tension of this light spring during the continued operation of the machine.

Fig. 23 shows the details of the valve V16 and bellows operator B16 by which the nitrogen gas pressure in the distributing pipe 123 is maintained at a selected uniform pressure, commonly 30 lbs. per square inch.

The valve V16 and its connections have been previously described. The bellows operator B16 comprises a casing 370, a recessed inner plate 371 and reversed bellows members 372 and 373 connected to said plate. A pipe 123ᵇ connects the nitrogen gas distributing pipe 123 to the interior of the casing 370 and to the space enclosed by the movable plate 371 and the reversed bellows members 372 and 373. The plate 371 is secured to the valve rod 127 by which the valve member 126 of the valve V16 is moved to open and closed positions. A spring 374 tends to move the valve member 126 to open position.

With this construction, and assuming that the toggle members 128 have been removed from locking position, an increase in pressure in the pipe 123ᵇ will compress the spring 374 and produce a closing movement of the valve member 126, thus reducing the supply of liquid nitrogen to the pipe 121 which feeds the heating coil 122. If pressure in the pipe 123ᵇ falls off, the spring 374 will act to increase the opening of the valve V16 and to correspondingly increase the supply of liquid nitrogen.

The nitrogen gas pressure in the distributing pipe 123 is thus maintained substantially uniform, except when the valve 126 is locked in closed position by the manually operated toggle members 128.

In Fig. 24 I have shown the details of construction of the sealing device 108 for the shaft 380 of the pump J in running position, it being understood that the sealing device for the pump 49 is identical. It is desirable in control apparatus for intermittent operation that the pump should be released by pressure only when the apparatus is in operation.

Each sealing device 108 comprises a disc 381 mounted on a pump shaft, as 380, and having radially disposed ribs 382 running with close clearance relative to a fixed plate 383 forming part of the casing 384 of the sealing device 108.

A sealing ring 386 of relatively small diameter is mounted on the inside of the disc 381 and rotates adjacent an inner plate 388, loosely surrounding the shaft 380 and held from rotation by a bellows member 389. An outer plate or disc 390 surrounds the plate 388 and overlaps the same at its inner edge, as clearly shown in Fig. 24. The plate 390 is held from rotation by a bellows member 391 and the plates 388 and 390 are pushed toward the rotated disc 381 by separate and concentric springs 392 and 393. Yielding flat spring members 395 (Fig. 24a) are mounted on the inner face of the disc 381 and yieldingly engage the outer surface of the outer plate 390 before the sealing ring 386 engages the corresponding surface of the inner plate 388.

When the apparatus is at rest and there is no pressure in the branch pipes 107a, the sealing ring 386 and the inner plate 388 are in close yielding engagement and seal the opening around the shaft 380.

Bellows operators B13 are mounted in outward extensions 384a of the casing 384 and comprise bellows members 395a having movable end plates 396 attached to plungers 397. The bellows members 395a are normally compressed by springs 398.

When pressure is applied through the branch pipes 107a to the bellows members 395, the plungers 397 are pushed against the outer plate 390 and move the non-rotated plates 390 and 392 away from the flat springs 395 and the sealing ring 386 and to the running position shown in Fig. 24. Subsequently the shaft 380 is free to rotate and the radial ribs 382 provide the necessary sealing action during such rotation.

As soon as the speed of the pump decreases substantially, however, the pressure in the pipes 107a will be reduced, the plungers 397 are withdrawn by the springs 398, the outer plate 390 engages the rotated flat springs 395, and the inner plate 392 thereafter engages the sealing ring 386, thus effectively sealing the pump while it is idle. The preliminary engagement of the flat rotated springs 395 with the non-rotated disc 390 when the pump is slowing down, and the delayed separation of these parts when the speed is increasing substantially decreases the wear on the sealing ring 386 and correspondingly prolongs the useful life of the sealing surface.

Fig. 25 is a sectional detail of one of the inner tanks 104 or 105 and shows the check valve structure by which the tank is filled with gasoline or liquid oxygen. This valve structure comprises a valve casing 400 having a valve member 401 yieldingly drawn up away from its seat by a light spring 402. The tanks 104 and 105 are submerged in the liquid contents of the tanks 42 and 43 and will be automatically filled with the liquid when the shut-off valves 98 and 99 (Fig. 1) are opened to vent the small pressure tanks 104 and 105 into the top portions of the tanks 42 and 43.

When the valves 98 and 99 are closed and helium gas pressure is supplied from the tank 45 (Fig. 1), through the pipe 405, check valves 406 and branch pipes 407 and 408, the valves 401 will immediately close and the liquid contents of the pressure tanks 104 and 105 will be forwarded to the generator 46 through the delivery pipes 304 and 306 previously described.

In order to conserve space, the pressure tank 105 in the oxygen tank 43 is nested in a recess in the side of the nitrogen tank 44 as clearly shown in Fig. 26.

In Fig. 27, I have shown the construction of the bellows operator B5 through which the control valve A3 opens the valve 97 and closes the valves 98 and 99 against the tension of the spring 410 (Fig. 1). The bellows operator B5 is simply constructed and comprises a casing 412 enclosing a bellows member 413, the movable end 414 of which is connected by a rod 415 to an arm 416 which actuates the rotatable shut-off member of the valve 97. The pipe 96 from the control valve A3 is connected to the recessed upper end 417 of the operator B5 and admits pressure to the bellows 413, thus depressing the arm 416 to open the valve 97 and to tension the cord 102 and close the valves 98 and 99 when the control valve A3 is opened and operative.

Having described the method of operation of a preferred form of my improved control mechanism and also the details of construction of the special valves and other devices used in said mechanism, it is believed that the advantages of my invention will be clearly apparent.

By the use of this control mechanism, the rocket apparatus may be started by momentary manual closing of the switch 70 and, without further attention by the operator, the control mechanism will then automatically perform the necessary sequence of predetermined steps to place the apparatus in full operation and will thereafter close down the apparatus, also in a sequence of predetermined steps, on a second momentary closing of the switch 70, or on exhaustion of fuel or oxygen supply, or on a substantial drop in pressure in the combustion chamber, due to failure of any part of the apparatus to function as designed. The provision of such automatic control mechanism greatly facilitates the successful operation of rocket apparatus and particularly in cases where no manual control is possible.

My improved apparatus is adapted to intermittent operation by its self-contained construction, as it is independent of all outside pressure connections for supplying tank pressures, starting the pumps and keeping the pumps sealed when not in use. In place of such outside connections, obviously not available after the initial start, I provide the helium gas tank and the relatively small pressure tanks in the tanks 42 and 43. The use of helium in the tank 45 is desirable, as it does not readily condense under heavy pressure.

The provision of improved sealing devices which are normally sealed by spring pressure rather than gas pressure also avoids the use of outside pressure connections.

The provision of means for varying the propulsive thrust by changing the setting of the tension regulating device G is also important and additional to the disclosure in my prior application.

In Fig. 30 I have shown a modified electrical arrangement for opening and closing the control valves A3 and A4 without cam action from the drum 60.

In this modified construction, the movable members of the control valves A3 and A4 are connected to plungers 450 and 451 (Fig. 30) slidable in solenoid coils 452 and 453. One side of each coil is connected through a wire 454 to one pole of a battery T2, and the other terminals of the coils are connected by wires 455 and 456 to pivoted armatures 457 and 458 in interlocking control switches K and K1. The armature 457 in the switch K is movable to engage a terminal 460 connected by a wire 461 to the second pole of the battery T2. A corresponding terminal 462 in the switch K1 is similarly connected by a wire 463 to the battery T2.

The control switches K and K1 are provided with magnets N and N1 respectively, connected at one side by wires 465 to the terminal 95 (Fig. 16) in the igniter 52 which is engaged by the thermostat member 94 when the igniter is in full operation. The other side of each magnet is connected by a wire 466 to a battery T2.

With this construction, expansion of the thermostat member 94 in the igniter 52 when the contact strip S4 is in circuit will close the battery circuits through the magnets N and N1, which magnets then attract the armatures 457 and 458, causing them to engage the terminals 460 and 462 and to thus complete operating circuits through the solenoids 452 and 453. These solenoids then attract the plungers 450 and 451 which are connected to open the control valves A3 and A4. The opening of these control valves then initiates the same cycle of operations as described when the valves A3 and A4 were opened by the cam segments C3 and C4 on the drum 60.

As the drum continues to rotate, cam segment C2 leaves control valve A2 and the feed of gasoline and oxygen to the igniter is discontinued. The device 94 cools and thereafter holds the S4 circuit open and also the circuits of the magnets N and N1, but the circuits through the armatures 457 and 458 and solenoids 452 and 453 remain closed.

The circuit through armature 457 and solenoid 452 also includes a solenoid 470 (Fig. 30) having a plunger 471 positioned to engage a lug 472 on the control drum 60ª. The plunger 471 is normally withdrawn by a spring 473 and preferably has a non-magnetic portion to engage the lug 472.

When magnet N is energized and valve A3 is opened, solenoid 470 will project plunger 471 into the path of lug 472, which will stop the drum shortly after valves A3 and A4 have opened and valve A2 has closed. The friction drive of the drum through spring 155 permits the stopping of the drum without stopping the motor M.

When sufficient pressure is developed by the pumps 49 and 50, the bellows operators B14 and B15 (Fig. 19) will lift the lever 113 and close a switch 480, thus completing a circuit through a second magnet N2 in the interlocking control switch K. The armature 481 of this magnet N2 normally rests against the end of the armature 457 of the magnet N but drops to the holding position shown in Fig. 31 when the magnet N is energized and the armature 457 is swung upward. This locks the armature 457 in circuit-closing position until the magnet N2 is energized by the closing of the switch 480. The armature 481 is then raised and the armature 457 is released to break the solenoid circuit and allow the control valve A3 to close. At the same time, solenoid 470 will be deenergized and plunger 471 will move outward, releasing drum 60ª for further rotation.

The drum will shortly be brought to rest by engagement of a contact strip S2, and the apparatus will continue in full operation until a circuit is completed by closing a switch 485. This completes a circuit through a magnet N3 which unlocks the armature 458 and thus causes the circuit through solenoid 453 to be broken.

The switch 485 corresponds in function to any of the switches 70, 135 and 137 previously described and may be controlled manually or automatically.

When the switch 485 is closed, the valve A4 closes and the drum 60ª is again started. Further procedure is under the control of the drum 60ª, all as previously described.

The construction shown in Fig. 30 thus constitutes a rapidly-acting alternative electrical control for the valves A3 and A4. The same results are accomplished by either the cam control or the electrical control of the valves A3 and A4, the electrical control being of advantage in reducing the time which would otherwise be required by the drum to effect corresponding operations.

Where the terms "gasoline" and "liquid oxygen" are used in the specification and also in the claims, it is to be understood that these terms include other liquid fuels and also other oxidizing agents which are liquid at very low temperatures.

The pump sealing structure best shown in Fig. 24 is not claimed herein but forms the subject matter of a divisional application, Serial No. 647,606, filed February 14, 1946.

Having thus described my invention and the advantages thereof, I do not wish to be limited to the details herein disclosed, otherwise than as set forth in the claims, but what I claim is:

1. In a rocket apparatus, a combustion chamber, a gas generator, storage tanks for gasoline and liquid oxygen, pumps to feed said liquids from said tanks to said generator and to said combustion chamber, turbines to drive said pumps, said generator producing gas to drive said turbines, and additional quick-acting high-pressure means to initially feed small portions of said gasoline and liquid oxygen to said gas generator to start gas production therein.

2. In a rocket apparatus, a combustion chamber, a gas generator, storage tanks for gasoline and liquid oxygen, pumps to feed said liquids from said tanks to said generator and to said combustion chamber, turbines to drive said pumps, said generator producing gas to drive said turbines, additional quick-acting high-pressure means to initially feed small portions of said gasoline and liquid oxygen to said gas generator to start gas production therein, and automatic means to discontinue said high-pressure feed to said generator when predetermined pump delivery pressures are attained.

3. In a rocket apparatus, a combustion chamber, a gas generator, feeding means for said combustion chamber operated by gas produced in said generator, a pressure tank to prime said generator, a receptacle containing an inert gas at high pressure, a connection between said pressure tanks and said receptacle, a control drum, means to start said drum in rotation, and means rendered operative by such rotation of said control drum and effective to open said connection between said receptacle and said pressure tank and to thereby render said high pressure inert gas effective to force the contents of said pressure tank into said generator, whereby said generator is primed and started in operation.

4. In a rocket apparatus, a combustion chamber, a gas generator, feeding means for said combustion chamber operated by gas produced in said generator, a pair of pressure tanks to prime said generator, means to fill said tanks with gasoline and liquid oxygen, a receptacle containing an inert gas at high pressure, a connection between said pressure tanks and said receptacle, a control drum, means to start said drum in rotation, and means operative by such rotation of said control drum and effective to open said connection between said receptacle and said two pressure tanks and to thereby render said high pressure inert gas effective to simultaneously inject the gasoline and liquid oxygen in said pressure tanks into said generator, whereby said generator is primed and started in operation.

5. In a rocket apparatus having a combustion chamber, storage tanks for gasoline and liquid oxygen, pumps to feed said liquids to said combustion chamber, turbines to drive said pumps and a generator to provide gas to drive said turbines, that improvement which comprises pressure tanks for liquid oxygen and gasoline, one-way filling connections from said storage tanks to said pressure tanks, connections from said pressure tanks to said generator, and means to apply high gas pressure to said pressure tanks to force the contents thereof to said generator when starting said apparatus.

6. In a rocket apparatus, a combustion chamber, a storage tank for a liquid used to produce combustion in said chamber, a gas generator, feeding means for said combustion chamber, a gas-conducting connection between said generator and said feeding means through which gas is supplied to operate said feeding means, a relatively small pressure tank mounted in said storage tank and immersed in the liquid in said storage tank, said pressure tank having a one-way filling connection from the interior of the storage tank and having a feed connection to the generator, means to normally vent said pressure tank to the space at the top of said storage tank, and means to apply high pressure to said pressure tank to feed the contents thereof to said generator when starting said apparatus and to simultaneously close the vent connection between said pressure tank and said storage tank.

7. In a rocket apparatus, a combustion chamber, separate storage tanks for liquids used to produce combustion in said chamber, a gas generator, feeding means for said combustion chamber, a gas-conducting connection between said generator and said feeding means through which gas is supplied to operate said feeding means, a relatively small pressure tank mounted in each of said storage tanks and immersed in the liquid in said storage tank, each pressure tank having a one-way filling connection from the interior of its storage tank and having a separate feed connection to the generator, means to vent each pressure tank to the space at the top of its storage tank, a container of high pressure inert gas, and means to simultaneously admit said high pressure gas to both pressure tanks to feed the contents thereof to said generator when starting said apparatus and to simultaneously close the vent connections between said pressure tanks and said storage tanks.

8. In a rocket apparatus having a combustion chamber, storage tanks for gasoline and liquid oxygen, pumps to feed said liquids to said combustion chamber, turbines to drive said pumps and a generator to provide gas to drive said turbines, that improvement which comprises pressure tanks for liquid oxygen and gasoline enclosed in said storage tanks and normally immersed in said liquids, one-way filling connections from said storage tanks to said pressure tanks, check valves in said connections opening toward said pressure tanks, connections from said pressure tanks to said generator, and means to apply high gas pressure to said pressure tanks to force the contents thereof to said generator when starting said apparatus.

9. In a rocket apparatus having a combustion chamber and nozzle effecting propulsion by rearward discharge of gases under pressure from said nozzle, tanks containing combustion-supporting liquids, pumps to deliver said liquids to said combustion chamber, turbines for driving said pumps and a means for producing gas for driving said turbines, that improvement which comprises regulating means remote from the combustion chamber and associated with the gas-producing means and effective to maintain a substantially uniform rate of discharge of gases from said gas-producing means to said turbines, and manual means to vary the rate of discharge which is thus uniformly maintained, and said latter means being adjustable to vary said discharge while said apparatus is in operation.

10. In a rocket apparatus having a combustion chamber and nozzle, storage tanks for gasoline and liquid oxygen, means to feed said gasoline and liquid oxygen from said tanks to said combustion chamber, means to produce gas for operating said feeding means and means to feed gasoline and liquid oxygen from said tanks to said gas-producing means, that improvement which comprises valves controlling said feed of gasoline and liquid oxygen to said gas-producing means, a regulating device for said valves remote from the combustion chamber and associated with the gas-producing means and effective to maintain a substantially uniform rate of discharge of gases from said gas-producing means to said feeding means, and manual means to change the operative effect of said regulating means and to thereby vary the rate of gas production in said gas-producing means.

11. In a rocket apparatus having a combustion chamber and nozzle, storage tanks for gasoline and liquid oxygen, means to feed said gasoline and liquid oxygen from said tanks to said combustion chamber, means to produce gas for operating said feeding means and means to feed gasoline and liquid oxygen from said tanks to said gas-producing means, that improvement which comprises valves controlling said feed of gasoline and liquid oxygen to said gas-producing means, an inert gas to actuate said valves, means to maintain said inert gas under substantially uniform initial pressure, a regulating device remote from the combustion chamber and associated with the gas-producing means and effective to maintain a reduced uniform operative pressure of said inert gas to actuate said valves, and manual means to change the reduced operative pressure and to thereby vary the feed of liquids to said gas-producing means and to thereby vary the rate of gas production in said gas-producing means.

12. In a rocket apparatus having a combustion chamber and nozzle effecting propulsion by rearward discharge of gases under pressure from said nozzle, tanks containing combustion-supporting liquids, pumps for said liquids, turbines for driving said pumps, and a means for producing gas for driving said turbines that improvement which comprises automatic means to maintain a substantially uniform rate of discharge of gases from said gas producing means, and said means including a regulating spring which effects an increase in the uniform rate as the spring tension is increased, and manual means to vary the maximum spring tension.

13. In a rocket apparatus having a combustion chamber and nozzle, means to feed gasoline and liquid oxygen to said chamber, tanks containing combustion-supporting liquids, pumps for said liquids, turbines for driving said pumps, and means for producing gas for driving said turbines, that improvement which comprises a device to automatically regulate the feed of said liquids to said gas producing means, and said device including a regulating valve, a tension spring having a valve-positioning effect in direct ratio to the spring tension, pressure-operated means to tension said spring, a stop to limit the maximum spring tension, and manual means to vary the position of said stop.

14. In a rocket apparatus, a combustion chamber, storage tanks for gasoline and liquid oxygen, a pump to feed gasoline to said combustion chamber, a pump to feed liquid oxygen to said combustion chamber, turbines for said pumps, a self-contained high pressure gas supply constituting a permanent part of said apparatus, a generator to supply gas to drive said turbines, means to apply said high pressure gas to initially inject gasoline and liquid oxygen from said storage tanks into said generator to generate gas and start said turbines and pumps in operation, and means to discontinue the application of said high pressure gas when said apparatus is in full operation, and the self-contained supply of high pressure gas being sufficiently large so that high pressure gas is thereafter immediately available to restart said apparatus.

15. In a rocket apparatus, a combustion chamber, storage tanks for gasoline and liquid oxygen, a pump to feed gasoline to said combustion chamber, a pump to feed liquid oxygen to said combustion chamber, turbines for said pumps, a self-contained high pressure gas supply constituting a permanent part of said apparatus, a generator to supply gas to drive said turbines, connections from said tanks to said generator, connections from said high pressure gas supply to said tanks, and means rendered operative by the attainment of predetermined feeding pressures by said pumps and effective to open said latter connections, thereby rendering said high pressure gas effective to quickly force gasoline and liquid oxygen into said generator.

16. In a rocket apparatus, a combustion chamber, storage tanks for gasoline and liquid oxygen, a pump to feed gasoline to said combustion chamber, a pump to feed liquid oxygen to said combustion chamber, turbines for said pumps, a self-contained high pressure gas supply constituting a permanent part of said apparatus, a generator to supply gas to drive said turbines, connections from said tanks to said generator, connections from said high pressure gas supply to said tanks, and means rendered operative by the attainment of predetermined feeding pressures by said pumps and effective to open said latter connections, thereby rendering said high pressure gas effective to quickly force gasoline and liquid oxygen from said tanks into said generator, and means to prevent delivery of gasoline or liquid oxygen under said high gas pressure to said pumps.

17. In a rocket apparatus, a combustion chamber, storage tanks for gasoline and liquid oxygen, a pump to feed gasoline to said combustion chamber, a pump to feed liquid oxygen to said combustion chamber, turbines for said pumps, a self-contained high pressure gas supply constituting a permanent part of said apparatus, a generator to supply gas to drive said turbines, means rendered operative by the attainment of predetermined feeding pressures by said pumps and effective to apply said high pressure gas to initially inject gasoline and liquid oxygen from said storage tanks into said generator, means to discontinue the application of said high pressure gas when said apparatus is in full operation, and means effective to close the connection to said high pressure gas supply as said apparatus becomes fully operative.

18. In a rocket apparatus, a combustion chamber, a gas generator, means operated by gases produced in said generator effective to feed combustion liquids to said chamber, a pressure tank containing a priming liquid for said generator, a receptacle containing an inert gas under high pressure, a connection between said receptacle and said pressure tank, operating means effective to open said connection and to thereby force said priming liquid into said generator, means to effect refilling of said pressure tank for subsequent priming of said generator, and means to render said refilling means inoperative by increase in pressure in said pressure tanks when the connection between the pressure tank and the high-pressure gas receptacle is opened.

19. In a rocket apparatus, a combustion chamber, storage tanks for gasoline and liquid oxygen, a pump to feed gasoline to said combustion chamber, a pump to feed liquid oxygen to said combustion chamber, turbines for said pumps, a self-contained high pressure gas supply constituting a permanent part of said apparatus, a generator to supply gas to drive said turbines, means to apply said high pressure gas to initially inject gasoline and liquid oxygen from said storage tanks into said generator to generate gas and thereby start said turbines and pumps, pressure-responsive means to discontinue the application of said high pressure gas when the pumps have developed predetermined feeding pressures, and means to prevent back flow of gasoline or liquid oxygen from said pumps to said storage tanks.

20. In a rocket apparatus having a combustion chamber, storage tanks for gasoline and liquid oxygen, and means to feed said liquids to said combustion chamber, in combination, a valve controlling certain steps in the operation of said apparatus, a solenoid to open said control valve, a thermostatic device associated with said combustion chamber and controlling the closing of the solenoid circuit, locking means to hold said circuit closed, and pressure-responsive means to release said locking means and to thereby open said circuit, said releasing means being responsive to the occurrence of predetermined operative pressures in said apparatus.

ROBERT H. GODDARD.